Aug. 9, 1960

C. W. KELLY ET AL 2,948,366

METAL DOOR STRUCTURE

Filed June 25, 1957

INVENTORS
CLYDE W. KELLY
DONALD J. McKINNON
JOSEPH F. HEINTZEL
ARTHUR C. HARPER Jr

BY Whittemore, Hulbert & Belknap
ATTRNEYS

Aug. 9, 1960 C. W. KELLY ET AL 2,948,366
METAL DOOR STRUCTURE
Filed June 25, 1957 3 Sheets-Sheet 2

*INVENTORS*
CLYDE W. KELLY
DONALD J. McKINNON
BY JOSEPH F. HEINTZEL
ARTHUR C. HARPER Jr.
*ATTORNEYS*

Aug. 9, 1960  C. W. KELLY ET AL  2,948,366
METAL DOOR STRUCTURE
Filed June 25, 1957  3 Sheets-Sheet 3
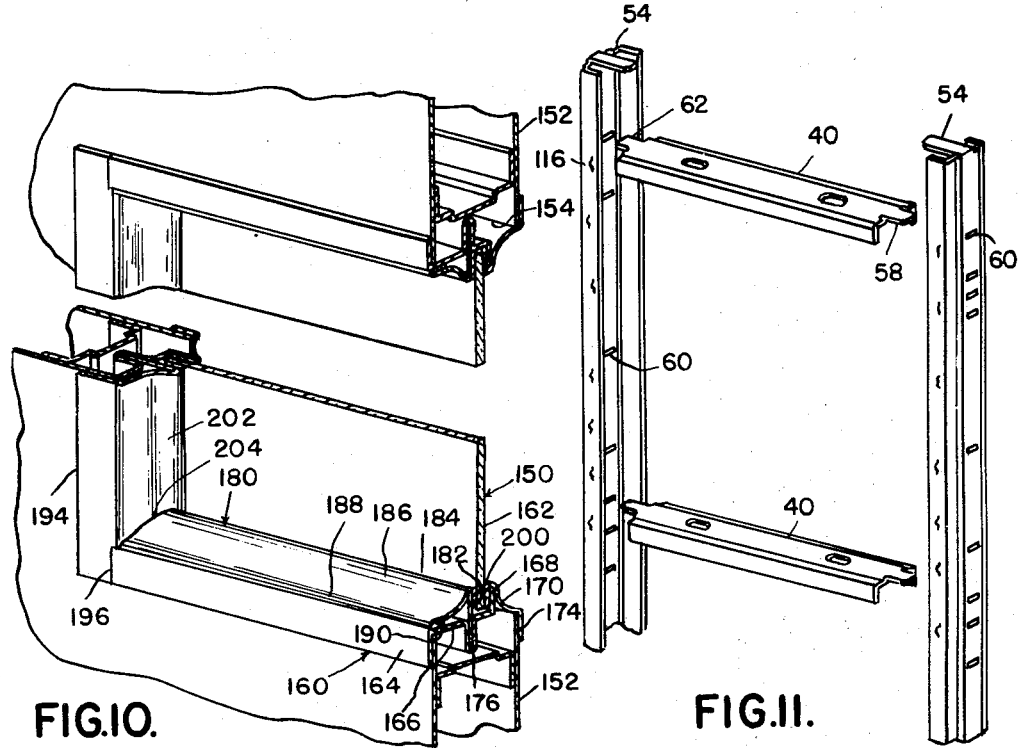
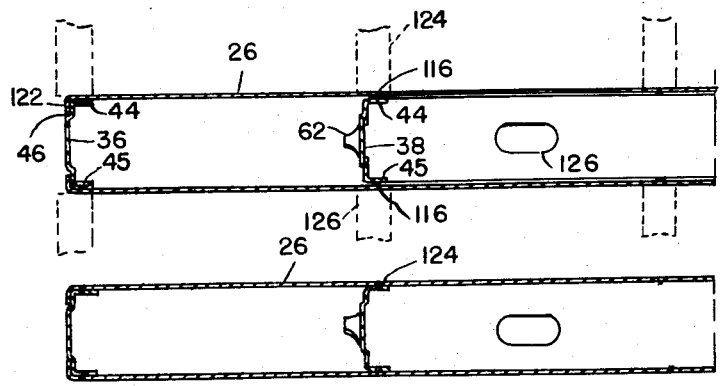
INVENTORS
CLYDE W. KELLY
DONALD J. McKINNON
BY JOSEPH F. HEINTZEL
ARTHUR C. HARPER Jr.
Whittemore, Hulbert & Belknap
ATTORNEYS United States Patent Office 2,948,366
Patented Aug. 9, 1960

2,948,366

METAL DOOR STRUCTURE

Clyde W. Kelly and Donald J. McKinnon, Detroit, Mich., and Joseph F. Heintzel and Arthur C. Harper, Jr., Erie, Pa., assignors to Fenestra, Incorporated, Detroit, Mich., a corporation of Michigan Filed June 25, 1957, Ser. No. 667,845

13 Claims. (Cl. 189—46)

The present invention relates to a metal door structure of the swing type that is used in building structures.

It is an object of the present invention to provide a metal door having a frame which is easily assembled and panels which are simultaneously welded to each side of the frame to form a strong rigid door.

It is a further object of the present invention to provide a door having a frame which is assembled and held together by novel means prior to the welding of the panels simultaneously to each side of the door and being held rigidly together after welding of the panels to the frame.

It is a still further object of the present invention to provide a metal door which is adapted for either swing-in or swing-out use by means of a novel hinge mounting reinforcement plate.

It is another object of the present invention to provide a frame for a vision pane of glass which can be easily assembled and disassembled.

It is a further object of the present invention to provide a reinforcement for a door closer that can be installed in place of the finished door.

Other objects and features of the invention will become apparent as the description proceeds, especially when taken in conjunction with the accompanying drawing, illustrating a preferred embodiment of the invention, wherein:

Figure 10 is a sectional view of the half panel vision light installation.

Figure 11 shows a partial view of two inside vertical stiles and two horizontal cross brace members before assembling.

Figure 12 is a partial view of a section through the door with the panels in place on both sides of the frame and prior to welding.

Figure 13 is a view similar to Figure 12 after welding the panels to the frame.

Figure 1:
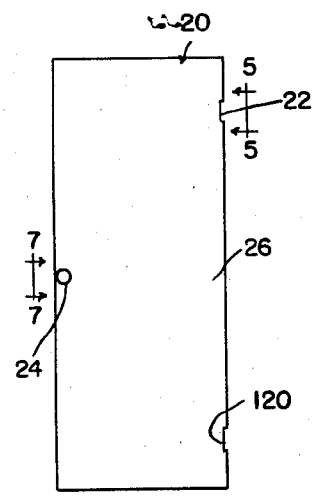
Figure 1 shows a view of the assembled door.
Figure 2:
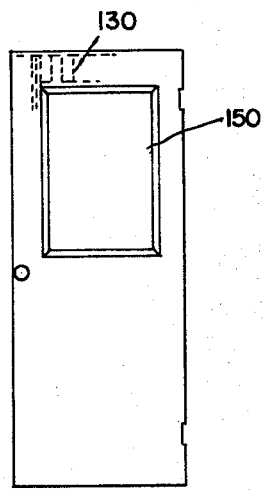
Figure 2 shows a view of the assembled door with a half panel vision light of glass installed.

Referring now to the drawings, there is shown at 20 a metal flush door of the swing type having offset portions 22 for the attachment of hinges, and an aperture 24 for the reception of a latch. The hinge attachments are preferably symmetrical about a horizontal centerline between each end of the door with the latch being on the centerline so that the door may be installed with either end of the door being top or bottom, and panel sections for both sides be interchangeable.

Figure 3:
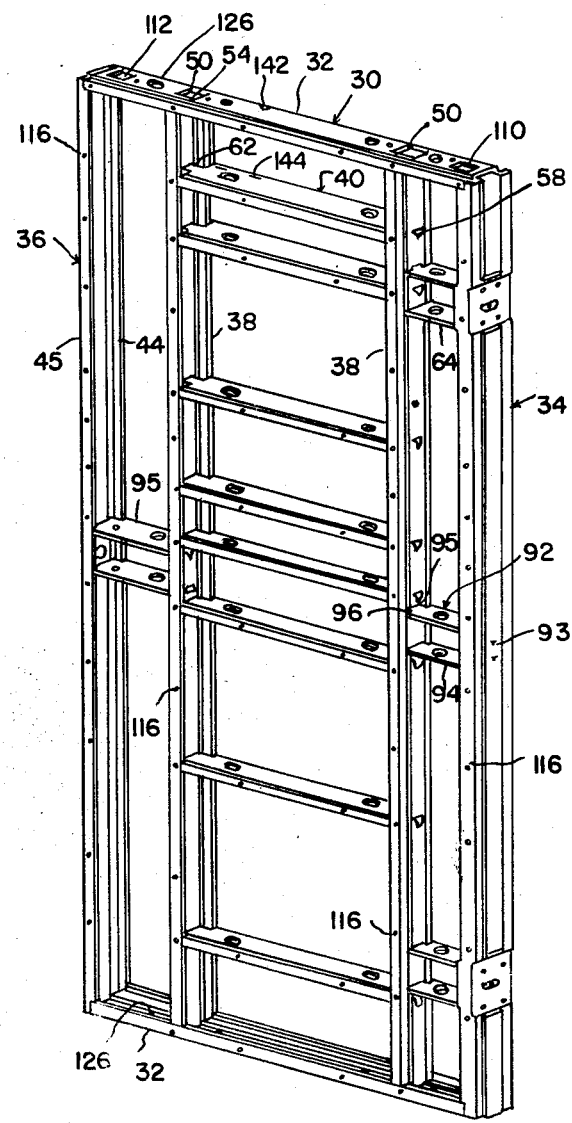
Figure 3 shows the door frame assembled and before welding the panel to each side.

The door is comprised of outer panel sections 26 and a frame assembly generally indicated at 30 in Figure 3. The frame has a rail bar 32 which is used at both ends, a hinge stile member 34, a lock stile member 36, and a pair of inside vertical stile members 38 adjacent both sides of the frame. Horizontal cross brace members 40 are also used at the several positions between the inside vertical stiles.

Figure 4:
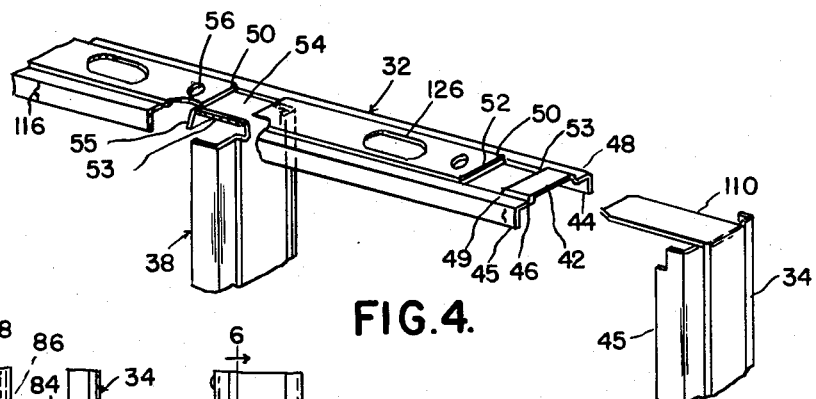
Figure 4 shows a portion of the upper right hand corner of the frame, partly broken away, illustrating how some of the frame members are assembled together.

The frame members 32, 34, 36 and 38 are fabricated from material of the same cross-section form, as shown in Figure 4, all having a web portion 42 and flanges 44 and 45. The web portion 42 is offset at 46 an amount equal to the thickness of the material to form shoulders 48 and 49.

Pairs of slots 50 are formed in the frame members 32 by shearing the material as at 52 and 53 across the web and forcing the material between the slots downwardly to form depressed ledge portions 53a. There are four pairs of slots in each end bar 32.

To assemble the frame, a vertical inner stile member 38 is attached to an end member 32 by placing the tab 54 through slots 50 and bending the end of the tab over, as seen at 55, by means of a punch or other object pushed through the aperture 56. The horizontal braces 40 are then placed in position with the tabs 58 through the slots 60 in the vertical stile. The ends of the tabs are twisted or bent over, as shown in Figure 3, to secure the braces in place. After all the braces have been placed in position, the opposite inner vertical stile 38 is assembled to the end member 32 in the same manner as previously described and at the same time the tabs 62 on the horizontal members 40 are placed through the corresponding slots in the second vertical stile and twisted or bent to secure the members together.

Figures 5, 6:
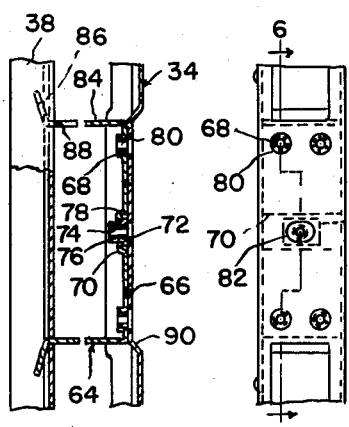
Figure 5 is a view of the hinge reinforcement, looking in the direction of the arrows 5—5, Figure 1.
Figure 6 is a section on the line 6—6, Figure 5.

The hinge stile 34, as seen in Figures 5 and 6, has secured to it the hinge reinforcement member 64 by welding as at 66. The reinforcement has four extruded and tapped holes 68 and an offset groove portion 70 defined beneath offset guide portions of the plate and extending completely across the edge of the member. The member 72, having a tapped hole 74, has flanges 75 which slide in the groove 70 with the portion 76 extending through the slot 78. The member 72 is placed in position in the groove prior to welding the reinforcement to the stile. This member 72 is movable across the edge of the door to cooperate with either pair of vertically aligned screw holes 68, so that a hinge plate having three screw holes may be mounted in either of two positions on the door.

Apertures 80 in the stile 34 provide clearance for the tapped holes 68 and elongated aperture 82 provides clearance for the tapped hole 74 in the member 72.

The hinge reinforcement member 64 has the additional function of interconnecting the hinge stile 34 and the adjacent inner stile 38 to reinforce the frame as well as to support the hinge reinforcement member. For this, it is provided with two legs 84 which extend toward the inner vertical stile 38 and terminate in tabs 86. The tabs have shoulders 88 which abut against the web of stile 38 and when the tabs are twisted, the legs 84 provide cross bracing between the stiles. The hinge stile 34 is offset at 90 so that when the leaf of a hinge (not shown) is mounted to the stile, the outer face of the leaf will be flush with the outer surface of the stile.

It will be noted that there are five tapped holes in the reinforcement with only three being used at one time for the attachment of the hinge leaf. This arrangement allows the hinge to be attached to the door using two tapped holes adjacent one side edge of the door and the centrally located tapped hole for mounting and swinging the door in one direction or using the two tapped holes adjacent the opposite side edge of the door and the centrally located tapped hole for mounting and swinging the door in the opposite direction. The centrally located tapped hole 74 is adapted to move sideways in the slot 70 to accommodate the corresponding center hole in the hinge leaf when the hinge is reversibly mounted on the door. In this manner the alignment of the three holes in the hinge leaf can be made with three holes in the door reinforcement.

A center brace 92, as best seen in Figure 3 is welded as at 93 to the lock stile 34 and has two legs 94 which terminate in tabs 95. A shoulder 96 is adapted to butt against the center stile 38.

Figures 7, 8:
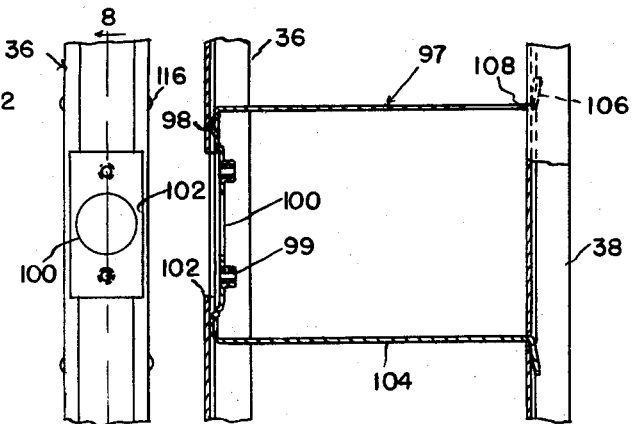
Figure 7 is a view of the lock reinforcement looking in the direction 7—7, Figure 1.
Figure 8 is a section on the line 8—8, Figure 7.

The lock stile 36, as best seen in Figures 7 and 8, has secured to it the lock reinforcement 97 by welding as at 98. The reinforcement has two extruded and tapped holes 99 and an aperture 100. The aperture 100 is for the insertion of a latch (not shown). A cutout 102 in the web of the stile provides clearance for a latch mounting flange and also allows the face of the latch to be flush with the outer face of the stile web. The reinforcement has two legs 104 which extend toward the inner vertical stile 38 annd terminate in tabs 106 and shoulders 108 which abut against the side of the web of the stile 38.

After the reinforcements and braces are attached to the lock and hinge stiles, the stiles are connected to the partially assembly frame. At each terminal end of both the hinge stile and lock stile, bent over tabs 110 and 112 project out at right angles to the web of the stiles. The hinge stile 34 and the lock stile 36 complete the frame assembly by passing the tabs 110 and 112 through the pairs of slots 50 adjacent both ends of the stiles and bending them inwardly as shown at 55 (Figure 4). At the same time the tabs 86 on the hinge reinforcement, 106 on the lock reinforcement, and 95 on the center brace are passed through the corresponding slots 60 (Figure 11) to the inside stiles. All these tabs are twisted to secure the members together.

The frame structure is adapted for easy assembly and the members are held in place while the assembly of the door is completed with the attachment of the panel sections. Referring now to Figures 3 and 12, welding projections 116 are formed along the flanges 44 and 45 of the stiles, horizontal braces and end members. The projections are positioned so that they are opposite to each other on the flanges 44 and 45 in pairs. The pairs of projections are spaced on the frame members so that they are in alignment both horizontally and vertically as shown in Figure 3.

The panel 26 has cut-outs at 120 to provide clearance for the attachment of hinges and an aperture 24 for insertion of a latch handle or knob. As the cut-outs and aperture are symmetrical about a horizontal centerline, the same panel can be used at either side of the door. The panel is bent over at right angles along each terminal edge to form the lip 122 as shown in Figure 12. A panel is placed over each side of the frame 30 with the lip 122 extending over the shoulders 48 and the ends of the panel flush with the face of the shoulders 48 on each end of bar 32. The frame with the panels 26 in position is placed on an electric welding machine (not shown). A series of electrodes are positioned in the welding machine so that a pair of electrodes 124 and 126 are in alignment with a pair of projections 116 located opposite to each other on the frame bars. The pair of electrodes can extend along the machine so that they are positioned opposite along a horizontal line of projections running from one side to the other of the frame or a line of vertical projections running from top to bottom of the frame. The welds are made by applying electric current and pressure simultaneously to the line of pairs of electrodes with the pressure and current flattening out the projections as the weld is made as at 124 in Figure 13. After completion of one line of welds, the door is moved in the machine to the next line of projections where the welds are made in the same manner. The process is repeated until all of the lines of pairs of projections have been welded. The assembly of the door has been completed with the panels forced against the frame as shown in Figure 13. It will be noted that the welding operation firmly secures all of the frame members to each other and to the panels, providing a door of great strength and rigidity, easily assembled from a minimum number of parts. The panels may, for example, be cold rolled steel of 22 gauge 1.030 inches thickness. Figure 13 shows the panels in place after welding.

To obtain access to the interior of the door after the panels have been welded in place, elongated slots 126 are provided. As shown in Figure 3, the slots are positioned so that they are in vertical alignment from top to bottom of the door. The slots provide drainage, ventilation and by the use of an elongated spraying apparatus, a coat of sound deadening or heat insulating material can be applied to the inside surfaces of the door.

Figure 9:
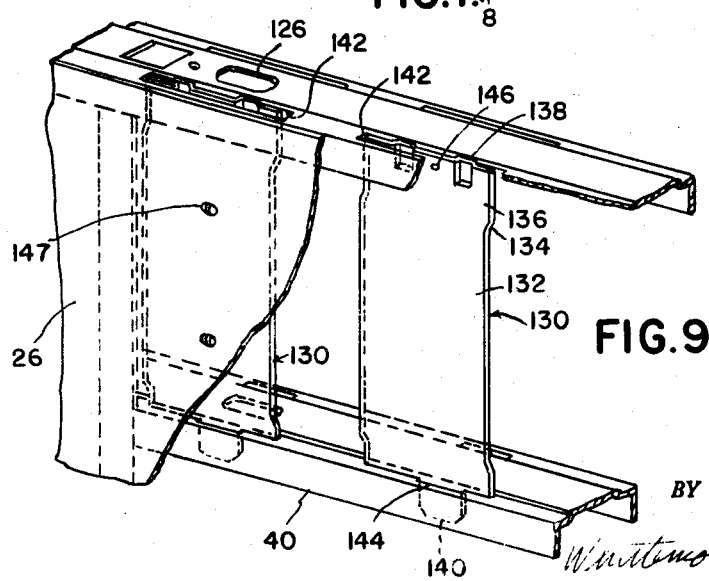
Figure 9 shows a partial view of the frame illustrating the manner in which door closer reinforcements are installed.

When it is desirable to attach a closer to the door, the plates or reinforcements 130 are provided (Figure 9). They are fabricated from sheet metal with a flat center portion 132 offset as at 134 at both ends so that the center portion will lie against the inner surface of the panel 26. Offset portion 136 has two bumps 138 struck out. Along the opposite terminal edge the tab 140 projects. Slot 142 in the end member 32 has sufficient length and width to enable the reinforcement to be inserted through the slot. Slots 144 in the horizontal member 40 allow the tab 140 to enter and hold the reinforcement secure in place. Bumps 138 fill out the slot 142 providing a tight fit of the reinforcement in the slot. Dimple 146 protrudes outwardly from the surface of portion 136 at the side opposite bumps 138 and midway therebetween. After passing through the slot, dimple 146 provides a shoulder to prevent the reinforcement from coming back out through the slot.

To prevent the reinforcements from being installed with the center portion 132 facing in the wrong direction, the tab 140 is offset from the vertical center-line. Since the slots 142 have a length only slightly greater than the transverse width of the plates 130, this prevents tabs 140 from entering slots 144 if the plates are reversed. Slots 144 are positioned in respect to slot 142 to allow the reinforcements to be installed in the proper position. Four pairs of slots 142 and 144 are in the door frame so that two reinforcements can be installed at either side of the door at any time after the door has been assembled. With the reinforcements in place the desired number of apertures 147 may be drilled or tapped through the panel and reinforcement to provide rigid anchorage for a door closure.

When it is desirable to provide a door with a vision light, generally indicated at 150 as best seen in Figure 10, members 40 are omitted from the frame assembly where the vision light is desired to be placed as indicated in Figure 11. For this purpose the plurality of slots 60 permit selective location of members 40 to define the top and bottom of the light openings. The panels 152 are cut out as at 154 to a size to accommodate the desired vision light. The cut-out is preferably made in the panel prior to assembly to the door frame. Frame member 160 for the pane of glass 162 has a flange 164, a web section 166 and a shoulder 168. The section 170 curves downwardly and outwardly with the flange 174 along the terminal edge. Slot 176 projects down from the web section 166. The dimension between the flanges 164 and 174 allows the member to fit snugly over the panels 152.

The glazing bead 180 has a portion 182 which fits into the slot 176. The portion 182 has a return bend at 184 and curves downwardly and outwardly at 186, terminating in a return bend at 188 to form the bead at 190.

The frames 194 having the cross-sectional shape as described for frame 160 are placed at each side of the opening formed by the cut-out indicated at 154. The frame 194 is notched back at 196 to provide a corner joint with members 160 which are placed in position after the members 194 are installed. The glass pane having a rubber or vinyl U-shaped sealing member 200 around its periphery, is mounted in the opening against the shoulder 168. The glazing beads 180 are placed in position by inserting the portion 182 into the slot 176. The glazing beads 202 are placed in position at each side of the opening first and the beads 180 have their ends coped as at 204 to fit flush against the contour of beads 202 to provide a snugly fitting corner joint. After the beads are pushed into place, they are held securely by the friction fit of the member 182 in the slot.

The drawing and the foregoing specification constitute a description of the improved metal door structure in such full, clear, concise and exact terms as to enable any person skilled in the art to practice the invention, the scope of which is indicated by the appended claims.

What we claim as our invention is:

1. A metal door construction including a frame assembly having a lock stile, a hinge stile and end members comprising the peripheral edge of the frame, vertical inner stile members extending between said end members, horizontal members between said vertical stile members, all of said frame members being fabricated from channel shaped material having a web and two flanges, panel members, means for attaching said panel members to the outer faces of the flanges of said frame members, a reinforcing plate received between the web of one of said end members and the web of an adjacent horizontal member, the web of said one end member having a slot whose length slightly exceeds the width of said plate and whose width is greater than the thickness of said plate, a tab at the inner edge of said plate, said adjacent horizontal member having a slot receiving said tab, the outer edge portion of said plate being retained in the slot in said one member, and a portion of said plate intermediate its inner and outer edge portions being in reinforcing abutting relation to one of said panel members.

2. A metal door having a frame including a border bar having a web and flanges at each edge thereof and a second frame bar spaced inwardly from said border bar, panels welded to said frame including the flanges of said border bar, a reinforcement plate disposed between said border bar and second frame bar, the web of said border bar having a first slot adjacent one edge thereof whose length is slightly greater than the width of said plate, said second frame bar having a second slot in alignment with said first slot, said reinforcement plate being inserted through said first slot and having a tang at its inner edge inserted through said second slot, the outer edge of said plate being retained in said first slot, a portion of said plate between its inner and outer edges abutting the inner surface of one of said panels.

3. A metal door having a frame including a border bar having a web and flanges at each edge thereof and a second frame bar spaced inwardly from said border bar, panels welded to said frame including the flanges of said border bar, a reinforcement plate received between said border bar and second frame bar, the web of said border bar having a first slot adjacent one edge thereof whose length is slightly greater than the width of said plate, said second frame bar having a second slot in alignment with said first slot, said reinforcement plate being inserted through said first slot and having a tang inserted through said second slot, the intermediate portion of said plate being offset to abut against the inner surface of the adjacent panel beyond the flange of said border bar.

4. A metal door having a frame including a border bar having a web and flanges at each edge thereof and a second frame bar spaced inwardly from said border bar, panels welded to said frame including the flanges of said border bar, the web of said border bar having a first slot adjacent one edge thereof, said second frame bar having a second slot in alignment with said first slot, a reinforcement plate inserted through said first slot and having a tang inserted through said second slot, the intermediate portion of said plate being offset to abut against the inner surface of the adjacent panel beyond the flange of said border bar, the first slot being wider than the thickness of said plate, and embossments adjacent the outer edge of said plate disposed to remain within the first slot when said plate is fully inserted to fill the width of the slot.

5. A metal door having a frame including a border bar having a web and flanges at each edge thereof and a second frame bar spaced inwardly from said border bar, panels welded to said frame including the flanges of said border bar, the web of said border bar having a first slot adjacent one edge thereof, said second frame bar having a second slot in alignment with said first slot, a reinforcement plate inserted through said first slot and having a tang inserted through said second slot, the intermediate portion of said plate being offset to abut against the inner surface of the adjacent panel beyond the flange of said border bar, the first slot being wider than the thickness of said plate, and embossments adjacent the outer edge of said plate disposed to remain within the first slot when said plate is fully inserted to fill the width of the slot, said plate having a projection between said embossments extending from the opposite side of said plate and positioned to pass through said first slot to engage beneath the web of said border bar to prevent removal of said plate.

6. A metal door comprising a rectangular frame having four relatively heavy border bars interconnected at the corners thereof, an opposite pair of said border bars comprising webs provided with shallow seats along the outer edges thereof and relatively short inwardly extending flanges, sheet metal panels welded to said flanges, said panels having edge portions turned at right angles and received in said seats to form flush edges.

7. A door as defined in claim 6 in which said edge portions of said panels are free.

8. In a metal frame, a construction comprising a pair U-shaped bars joined at an end of one of said bars, said bars being of identical cross-section and having webs and flanges at the edges of said webs, said web having an intermediate longitudinally extending offset portion spaced inwardly from said edge flanges, one of said bars having a pair of slits extending transversely of the offset portion of its web, the material of the web between the slits being formed inwardly between the flanges by an amount to open the slits into longitudinally open slots having a width about equal to the web thickness of said bars and to form a flat bearing portion spaced from the plane of said offset portion, the other bar having a tang at one end bent at right angles to extend in the same direction as its flanges, said tang being inserted through both of said slots and bent over therebeyond, the web of said first bar having an opening adjacent one of said slots for insertion of a tool to bend the end of said tang into interlocking shape after insertion through both of said slots.

9. A metal frame having a pair of bars joined at their ends to form a frame corner, said bars being of identical cross-section and having a web and edge flanges, said web having an intermediate longitudinally extending offset portion spaced inwardly from the edge flanges thereof, the material of the offset portion of the web of one of said bars being provided adjacent an end thereof with a pair of spaced slits and the material of said offset portion intermediate said slits being pressed out of the plane of said offset portion in the direction in which said flanges extend to form an opening longitudinally of said one bar, and a flat bearing portion spaced from the plane of said offset portion, the other bar having a tang whose width is approximately equal to the width of said offset portion of the web thereof bent at right angles to said other bar and extending through said opening, the portion of said tang extending beyond said opening being bent away from the web of said one bar to interlock said bars.

10. A metal door construction including a frame assembly having a lock stile, a hinge stile and end members comprising the peripheral edge of the frame, vertical inner stile members extending between said end members, said hinge stile having a web and edge flanges and a hinge reinforcement and mounting plate attached to the web of said hinge stile at the inner side thereof and having an extending portion attached to the adjacent inner stile member, said plate having threaded holes for the reception of hinge fastening screws, and openings in the web of said hinge stile exposing the threaded holes in said plate.

11. A door construction as defined in claim 10 in which said hinge reinforcement plate is welded to said hinge stile and is connected to said adjacent inner stile by an interlocked tang and slot connection.

12. In a metal door construction, a frame including a hinge stile having a web and edge flanges, said web having an inwardly offset portion defining a hinge receiving recessed seat, said seat having a plurality of upper and lower hinge fastener receiving openings and a laterally enlarged intermediate fastener receiving opening, a hinge reinforcement plate secured to the inner surface of the offset portion of the web of said hinge stile, said plate having threaded hinge fastener receiving openings in alignment with said upper and lower openings in said stile, and a hinge fastener receiving member slidably secured to said plate for movement transversely of said enlarged intermediate fastener receiving opening to provide for reversible attachment of hinge elements on said door.

13. In a door as defined in claim 12, said plate having guide portions offset from the plane thereof, and said fastener receiving member having flanges slidably disposed beneath the offset flanges of said plate.

References Cited in the file of this patent

UNITED STATES PATENTS

| | | |
|---|---|---|
| 1,680,538 | Gross | Aug. 14, 1928 |
| 1,860,438 | Thies | May 31, 1932 |
| 1,917,871 | Birt | July 11, 1933 |
| 1,955,181 | Goddard | Apr. 17, 1934 |
| 2,304,126 | Skeel | Dec. 8, 1942 |
| 2,427,393 | Eckel | Sept. 16, 1947 |
| 2,482,592 | Miller et al. | Sept. 20, 1949 |
| 2,589,864 | Raskin | Mar. 18, 1952 |
| 2,677,443 | Kottick | May 4, 1954 |